United States Patent [19]

Bächtold

[11] Patent Number: 4,788,750
[45] Date of Patent: Dec. 6, 1988

[54] APPARATUS FOR THE PREPARATION OF MEAT PRODUCTS DISPLAYING A PATTERN WHEN CUT

[76] Inventor: Walter Bächtold, Silstighof, CH-8226 Schleitheim, Switzerland

[21] Appl. No.: 75,812
[22] PCT Filed: Oct. 2, 1986
[86] PCT No.: PCT/CH86/00138
§ 371 Date: Jun. 30, 1987
§ 102(e) Date: Jun. 30, 1987
[87] PCT Pub. No.: WO87/02549
PCT Pub. Date: May 7, 1987

[30] Foreign Application Priority Data

Oct. 31, 1985 [CH] Switzerland .................. 04691/85

[51] Int. Cl.$^4$ ............................................. A22C 7/00
[52] U.S. Cl. ..................................... 17/35; 425/131.5
[58] Field of Search .................. 17/32, 35; 425/131.5

[56] References Cited

U.S. PATENT DOCUMENTS

| | | |
|---|---|---|
| 1,543,389 | 6/1925 | Knight . |
| 3,722,034 | 3/1973 | Baccetti .............................. 17/32 |
| 4,293,979 | 10/1981 | Culosimo et al. ................... 17/32 |
| 4,340,994 | 7/1982 | dos Santos et al. ............... 17/32 X |
| 4,372,734 | 2/1983 | Dolan et al. ....................... 17/32 X |

FOREIGN PATENT DOCUMENTS

| | | |
|---|---|---|
| 444873 | 10/1912 | France . |
| 2469874 | 5/1981 | France . |
| WO80/00908 | 5/1980 | PCT Int'l Appl. . |

Primary Examiner—Willie G. Abercrombie
Attorney, Agent, or Firm—Burns, Doane, Swecker & Mathis

[57] ABSTRACT

For the filler mass and each pattern die part required, a container (3A, 3B, 3C, 3D) each is provided with a filler device (4, 5) arranged in each of them, and a common force-meat filler fitting (11) and at least one pattern die (12) opening centrally into said fitting (11), laid out so that the overall outlet area corresponds to the cross section of a diagonally divided flask mold (15, 15') applicable to said filler fitting (11). The filler device consists preferably of a pressure generating elevating spindle gear (5) with a pressure piston (4) mounted thereon. The two parts of the flask mold (15, 15') comprise beads (17, 17') on their longitudinal edges, so that both halves may be secured by means of clamps engaging said beads and that a flask mold (15, 15') locked in this manner may be used as a cooking mold.

10 Claims, 3 Drawing Sheets

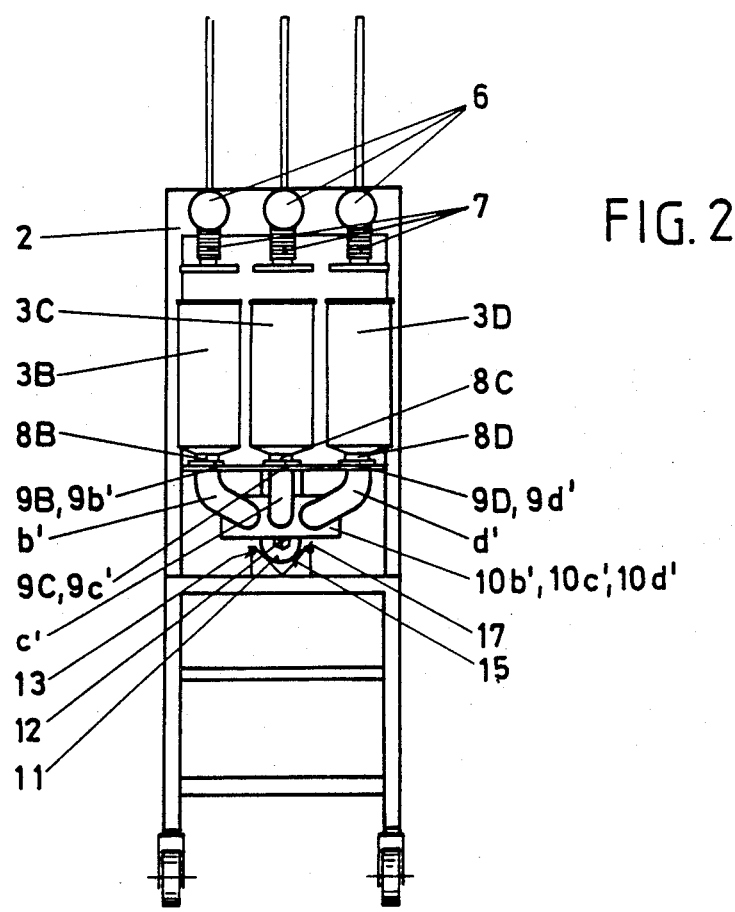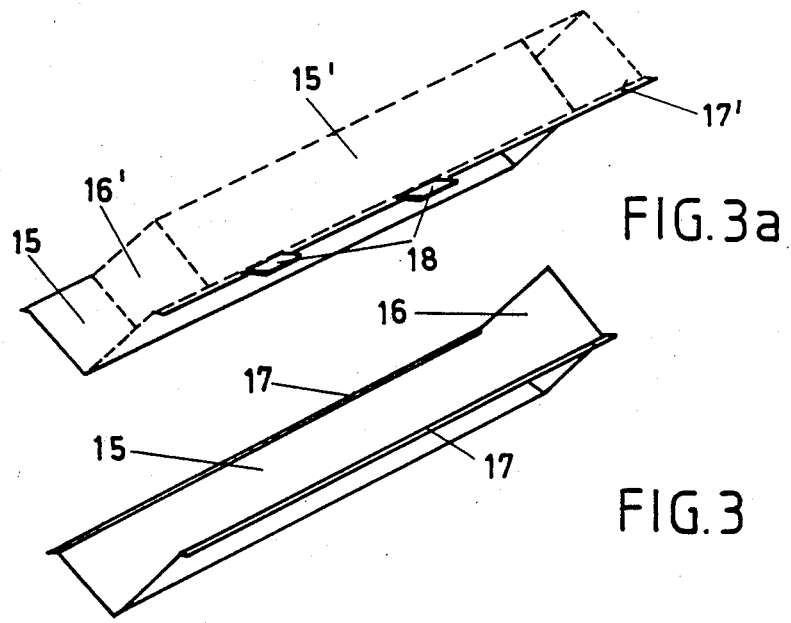

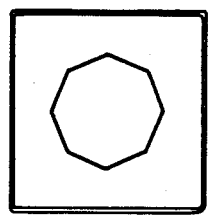
a
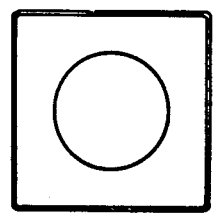
b
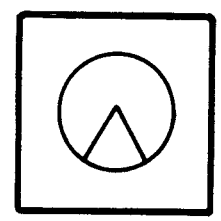
c
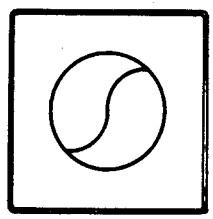
d
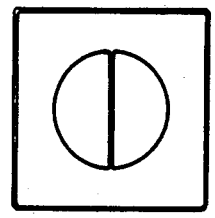
e
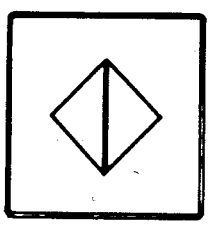
f
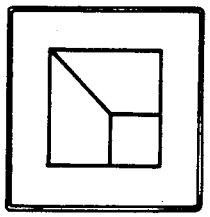
g
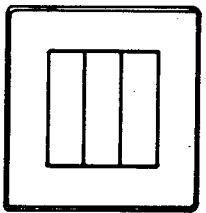
h
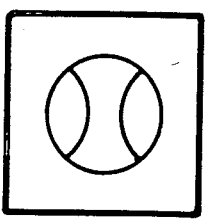
i
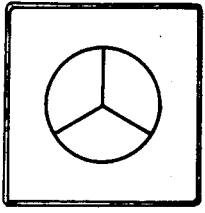
k
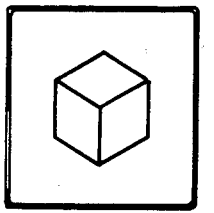
l
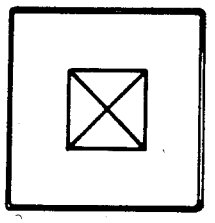
m
FIG. 4

APPARATUS FOR THE PREPARATION OF MEAT PRODUCTS DISPLAYING A PATTERN WHEN CUT

FIELD OF THE INVENTION

The present invention concerns an apparatus for the preparation of meat products displaying a pattern when cut.

BACKGROUND OF THE INVENTION

The preparation of meat and sausage products with variously colored inserts is highly labor intensive. Thus, the force-meats consisting of different meat grades and colors must be cooked in separate flask molds, cooled, and cut on trays into small elementary parts, preferably strips that may be square or rhomboidal in cross section. The force-meat may also be cooked in special insert molds, cooled and the finished insert taken from them. The meat or sausage portions prepared by the individual cooking processes are then placed into a common mold, the mold cast with force-meat and again exposed to a cooking process. In addition to the extensive labor required, the process steps involve a time delay that is detrimental to quality.

OBJECTS AND SUMMARY OF THE INVENTION

It is an object of the invention to simplify the known processes by providing an appropriate apparatus, to improve the quality of meat products displaying a pattern when cut and to eliminate the working steps required heretofore.

The object is attained according to the invention by the characteristic elements of claim 1. Further embodiments are set forth in the dependent claims.

The advantage of the apparatus according to the invention is to be found in that by the simple changing of pattern dies in the force-meat filler fitting in combination with the force-meat surrounding the center pattern insert by the mass and pressure control of the pistons alone in the containers a volume filling a flask mold may be obtained in a single working step.

A further advantage consists of that by the diagonal division of the mold receiving the entire filling volume, the desired length may be predetermined and that furthermore by the simple placing of the second half of the flask mold with the second end surface onto the fill volume rising in the first half of the mold to the first end surface, a closed box-like block may be obtained. By applying clamps to the longitudinal beads of the two mold halves, the closed flask mold may simultaneously also be used as a cooking mold.

The single cooking process required results in a better coherence and also in a significant improvement in the quality of the meat products.

The fill mass and the pattern inserts for the appropriate dies may be introduced both under overpressure or reduced pressure.

BRIEF DESCRIPTION OF THE DRAWING

The drawing shows an example of embodiment of the object of the invention in a simplified and partially perspective manner.

In the drawing:

FIG. 2 is a front elevation view of an apparatus according to FIG. 1,

FIGS. 3 and 3a are perspective views of a diagonally divided flask mold, with one half of each being indicated by solid and broken lines and FIGS. 4a–m are schematic views of different possible configurations of pattern dies.

DETAILED DESCRIPTION OF THE PREFERRED EMBODIMENT

Figure 1:
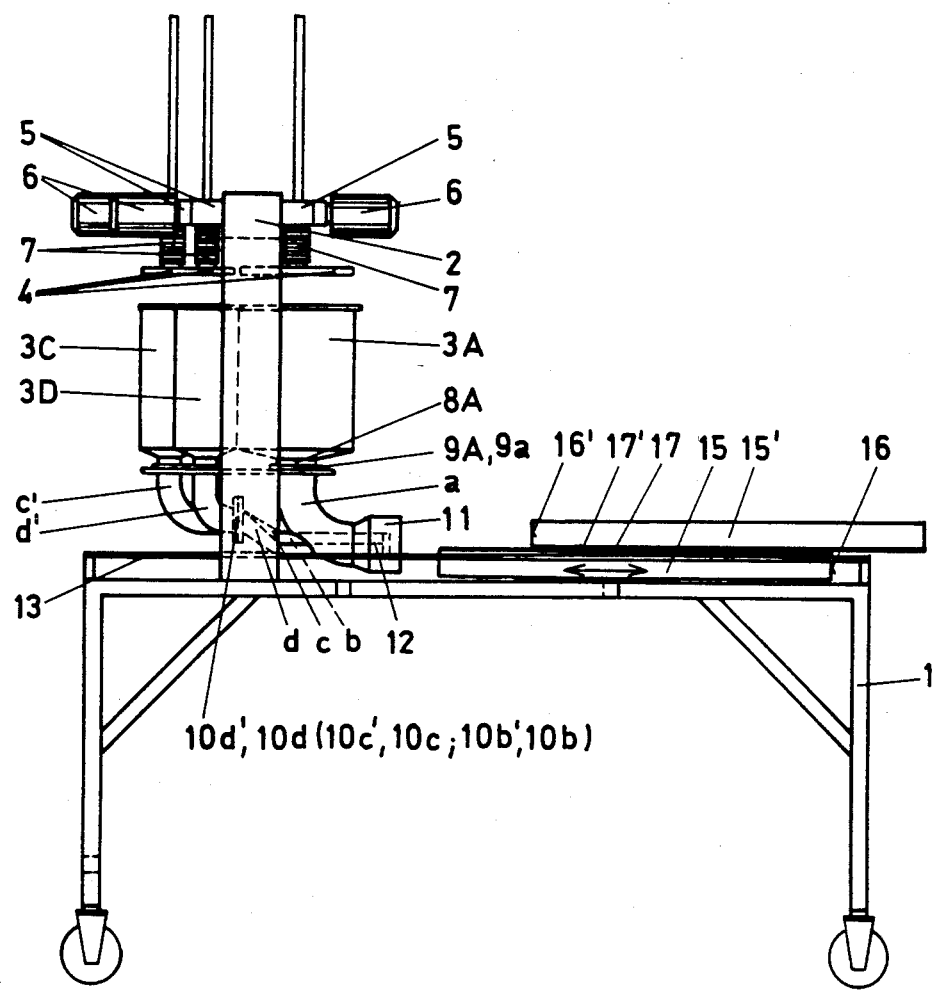
FIG. 1 is a lateral elevation view of the apparatus according to the invention.

According to FIGS. 1 and 2, a holding frame 2 is placed on a work table 1, with the holding frame comprising on the one hand several, for example three containers 3B, 3C, 3D for different grades and/or color tones of insertion force-meats and on the other, a container 3A for the force-meat surrounding the inserts. An outlet fitting 8A, 8B, 8C, 8D equipped with a flange 9A, 9B, 9C, 9D is set into the bottom of each of the containers. Each container 3A, 3B, 3C, 3D is provided with a motor-driven elevating spindle gear 5 acting on a displaceable pressure piston 4. A folding bellow 7 is provided between each pressure piston 4 and spindle gear 5 to prevent the penetration of contaminations into the containers 3A, 3B, 3C, 3D. Connecting lines b', c', d' are flanged onto the flanges 9B, 9C, 9D of the outlet fittings 8B, 8C, 8D of the containers 3B, 3C, 3D, and further lines b, c, d are connected by means of the flange connections 10b', 10b, 10c', 10d', 10d, with the corresponding interchangeable dies 12 forming the patterns. A line a connected directly with a force-meat filler fitting 11 is flanged onto the flange 9A of the outlet fitting 8A of the container 3A. In the case of the three-part pattern die 12 for a correspondingly multiple part insert according to FIG. 4, g–l, for example the lines b', c', d' exiting from the containers 3B, 3C, 3D lead through a common flange piece 10b, 10'/10c, 10c'/10d, 10d' to the conically tapering tubing parts b, c, d, which open into the force-meat filler fitting 11 and are configured therein in keeping with the shape of the insert desired. Advantageously, the combination of the pattern dies 12 shaping the inserts may be shorter than the force-meat filler fitting 11, whereby it is avoided that the inserts extend to the end surface 16 of the flask mold 15, which could lead to a possible disintegration of the meat product during the subsequent opening of the mold 15, 15'.

A holder 13 is provided on the work table 1, on the outlet side of the force-meat filler fitting, to which one half of the diagonally oriented flask mold 15 (FIG. 3) is applied with its bead 17, so that the end surface 16 is almost in contact with the outlet of the force-meat filler fittings 11 and then is displaced by the pressure of the meat mass onto the holder 13 (to the right in the drawing), until the mold half 15 is filled. The pressure on the pistons 4 of the containers 3A, 3B, 3C, 3D is then discontinued, the exiting fill mass cut at the force-meat filler fitting 11, the second mold half 15' put in place and the mold locked by means of the clamps 18 acting on the beads 17, 17' of the mold halves 15, 15' (FIG. 3a). As the filler mass (force-meat) has a relatively high consistency and is precompressed by the pressure pistons 4 in the containers 3A, 3B, 3C, 3D, the filler volume retains its shape determined by the common force-meat fitting 11, until the second mold half 15' is put in place.

As seen from the configurations provided as examples of FIG. 4a–m, depending on the shape, color and quality of the inserts, single-part (FIG. 4a–b), two-part (FIG. 4c–f), three-part (FIG. 4g–l) and multiple part (FIG. 4m) pattern dies may be introduced into the force-meat filler fitting 11. There are no limits to the plurality of the insert dies and they are not limited to the examples presented.

While this invention has been illustrated and described in accordance with a preferred embodiment, it is recognized that variations and changes may be made and equivalents employed herein without departing from the invention as set forth in the claims.

What is claimed is:

1. An apparatus for use in producing meat products displaying cross-sectional patterns, the apparatus comprising:
    a plurality of containers for holding filling and insertion materials, each of the containers including a container outlet and material feeding means for feeding the material in the container to the container outlet;
    a filling fitting common to the outlets of all of the plurality of containers, the filling fitting including a pattern die defining a fitting outlet having a fitting outlet area through which the materials from the containers are delivered; and
    a box mold positionable adjacent the fitting outlet for receiving the materials after they have been delivered from the filling fitting, the box mold having a cross-sectional area substantially equal to the fitting outlet area.

2. The apparatus according to claim 1, wherein one of the containers if a filling mass container, at least one other container is an insert container, and all of the containers include flanged joint members at the container outlets, and wherein the pattern die includes at least one conically tapering tubular part connected between the pattern die and the flanged joint member of the at least one insert container, and the filling fitting includes a connection means for connecting the filling fitting with the flanged joint member of the filling mass container, the filling fitting and the pattern die together forming a replaceable filling unit.

3. The apparatus according to claim 1, further comprising a plurality of pattern dies, each of the dies being selectively positionable in the filler fitting and having a cross-sectional size and configuration which differs from the other pattern dies.

4. The apparatus according to claim 2, wherein the filling mass container and the at least one insert container are replaceable.

5. The apparatus according to claim 1, wherein the box mold includes two identical box mold portions, each including two adjacent walls of the container and an end wall, the walls including longitudinal edges having a beading therealong, the beadings of the box mold portions providing an overlap of the mold portions for clamping the mold shut.

6. The apparatus according to claim 1, wherein the box mold includes two box mold sections, each including an end wall of the box mold.

7. The apparatus according to claim 5, wherein each end wall is square-shaped.

8. The apparatus according to claim 5, wherein each end wall has a geometrically symmetrical configuration.

9. The apparatus according to claim 1, wherein the material feeding means includes a pressure generating elevating spindle gear having pressure pistons mounted thereon.

10. The apparatus according to claim 1, wherein the material feeding means is connected with an installation generating reduced pressure.

* * * * *